(12) United States Patent
Zhang et al.

(10) Patent No.: US 8,421,971 B2
(45) Date of Patent: Apr. 16, 2013

(54) LIQUID CRYSTAL DISPLAY MODULE AND ONE-PIECE BACK PLATE THEREOF

(75) Inventors: Yanxue Zhang, Shenzhen (CN);
Chengming He, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 119 days.

(21) Appl. No.: 13/220,674

(22) Filed: Aug. 29, 2011

(65) Prior Publication Data

US 2012/0140139 A1 Jun. 7, 2012

(30) Foreign Application Priority Data

Dec. 2, 2010 (CN) .......................... 2010 1 0575600

(51) Int. Cl.
*G02F 1/1337* (2006.01)
(52) U.S. Cl.
USPC .......................................... 349/129; 349/108
(58) Field of Classification Search ................ 349/58–60
See application file for complete search history.

(56) References Cited

FOREIGN PATENT DOCUMENTS

| CN | 1912690 A | 2/2007 |
|----|-----------|--------|
| CN | 101221309 A | 7/2008 |
| CN | 101649974 A | 2/2010 |
| CN | 201517751 U | 6/2010 |
| CN | 101852373 A | 10/2010 |
| JP | 11305205 A | 11/1999 |
| JP | 2005201938 A | 7/2005 |

*Primary Examiner* — Phu Vu
(74) *Attorney, Agent, or Firm* — Cheng-Ju Chiang

(57) ABSTRACT

The present invention provides a liquid crystal display (LCD) module and a one-piece back plate thereof. The one-piece back plate of the LCD module comprises a plurality of first stepped portions, a plurality of second stepped portions and a plurality of engaging portions extending and being bent from the bottom thereof in sequence. An optical film assembly is supported and mounted by the first stepped portions, and a liquid crystal panel is supported and mounted by the second stepped portions. With the design of the one-piece back plate of the LCD module of the present invention, it is possible to omit the housing and the front frame, and the liquid crystal panel can be directly arranged on the one-piece back plate, so as to simplify and speed up the assembly process, and to further reduce the research cost, development cycle and production cost thereof.

20 Claims, 4 Drawing Sheets

LIQUID CRYSTAL DISPLAY MODULE AND ONE-PIECE BACK PLATE THEREOF

FIELD OF THE INVENTION

The present invention relates to a liquid crystal display (LCD) module and a one-piece back plate thereof, and more particularly to an LCD module and a one-piece back plate thereof without using a plastic frame and a front frame.

BACKGROUND OF THE INVENTION

A liquid crystal display (LCD) is a kind of flat panel display (FPD) which displays images by the property of the liquid crystal material. In comparison with other display devices, the liquid crystal display has the advantages in lightweight, compactness, low driving voltage and low power consumption, and thus has already become the mainstream produce in the whole consumer market. However, the liquid crystal material of the liquid crystal display cannot emit light by itself, and must depend upon an external light source. Thus, the liquid crystal display further has a backlight module to provide the needed light source.

Generally, the backlight module can be divided into two types: a side-backlight module and a bottom-backlight module. In the side-backlight module, the light of the light source is emitted into a light guide plate from one side thereof, and is outputted from a top surface thereof by a specific reflection of the light guide plate. On the other hand, the bottom-backlight module does not include the light guide plate, and outputs the light of the light source through a lower reflective plate disposed below and an upper diffusion sheet.

The backlight module is assembled by various components, such as light sources, a lamp shade, a reflector plate, a light guide plate, a diffusion sheet, a brightness enhancement film and a plastic frame. In general, a liquid crystal panel is assembled on the backlight module, so as to form the liquid crystal display.

Referring now to FIG. 1, a partially exploded perspective view of a traditional liquid crystal module is illustrated, wherein a liquid crystal module 10 substantially comprises a backlight module 11, a liquid crystal panel 12, a front frame 13, a plurality of first screws 14 and a plurality of second screws 15. The backlight module 11 has a plurality of optical films 110 and a housing 111. The housing 111 is a rectangular outer housing, wherein a back plate and a plurality of light sources (not shown) are first received in the housing 111, and then the optical films 110 are disposed above the back plate in the housing 111. Furthermore, the housing 111 has at least one side surface formed with a plurality of first screw holes 112, while the housing 111 further has an upper surface formed with a plurality of second screw holes 113. The liquid crystal panel 12 has a driver circuit board 121 on at least one side thereof, wherein the driver circuit board 121 has a plurality of driver ICs and a plurality of openings 122 formed on suitable positions thereof. The front frame 13 is a rectangular outer frame, and the front frame 13 has an upper surface formed with a plurality of installation holes 131. In installation, the liquid crystal panel 12 is first disposed on the backlight module 11, and the first screws 14 pass through the openings 122 of the driver circuit board 121 for screw-connecting with the first screw holes 112 formed on the side surface of the housing 111. Subsequently, the front frame 13 is pressed and disposed on the liquid crystal panel 12, and the second screws 15 pass through the installation holes 131 on the upper surface of the front frame 13 for screw-connecting with the second screw holes 113 on the upper surface of the housing 111. Therefore, by using the first screws 14 and the second screws 15, the backlight module 11, the liquid crystal panel 12 and the front frame 13 can be assembled as one-piece to form the liquid crystal module 10.

However, in actual installation, there are still some problems existing in the traditional liquid crystal module 10 described below. Each existing liquid crystal module 10 needs the back plate, the housing 111 and the front frame 13, and the assembly method is complicated. Moreover, with the continuous increase of types and sizes of LCD panels, the sizes and material of the front frame 13 and the housing 111 of the backlight module 11 are correspondingly increased. The front frames 13 and the housings 111 with various sizes can not be used in common. Therefore, new molds for manufacturing the front frame 13 and the housing 111 have to be continuously developed, resulting in the increase of the developing cost and the assembly time. In other words, it is an important point to reduce the number of the elements of the back plate, the housings 111 and the front frames 13, and even to omit some of the elements.

As a result, it is necessary to provide a liquid crystal display module to solve the problems existing in the conventional technologies, as described above.

SUMMARY OF THE INVENTION

A primary object of the present invention is to provide a liquid crystal display module, wherein a plurality of first stepped portions, a plurality of second stepped portions and a plurality of engaging portions extend and are bent from the bottom of a one-piece back plate thereof in sequence. An optical film assembly is supported and mounted by the first stepped portions, and a liquid crystal panel is supported and mounted by the second stepped portions, and the liquid crystal panel is engaged and held by the engaging portions and the second stepped portions. Therefore, the one-piece back plate can be utilized to achieve the function of the housing and the front frame, and it is possible to omit the housing and the front frame, and the liquid crystal panel can be directly arranged on the one-piece back plate, so as to simplify and speed up the assembly process, and further to reduce the research cost, development cycle and production cost thereof.

A secondary object of the present invention is to provide a liquid crystal display module which uses at least one first fixer to mount the optical film assembly, and uses at least one second fixer to mount the liquid crystal panel, so as to simplify the installation thereof.

A further object of the present invention is to provide a liquid crystal display module, wherein at least one flexible board supporting recess is formed at the top surface of the first stepped portion for supporting a flexible board portion of a flexible circuit board device disposed at one sides of the liquid crystal panel, and preventing the flexible board portion from being split in assembly. In addition, the one-piece back plate further comprises a circuit board cover configured to cover the flexible circuit board device.

To achieve the above object, the present invention provides a one-piece back plate of a liquid crystal display module, comprising: a first edge, a second edge, a third edge and a fourth edge, wherein the first edge is opposite to the third edge, and the second edge is opposite to the fourth edge; the one-piece back plate comprises: a plurality of first stepped portions having an inverted L-shaped profile and extending upward and outward at least from the first edge and the third edge; and a plurality of second stepped portions having the inverted L-shaped profile and extending upward and outward at least from outer edges of top surfaces of the first stepped portions at the first edge and the third edge; wherein an optical film assembly is supported and mounted on the top surfaces of the first stepped portions, and a liquid crystal panel is supported and mounted on the top surfaces of the second stepped portions.

In one embodiment of the present invention, at least one first fixer is disposed at the top surfaces of the first stepped portions to fix the optical film assembly.

In one embodiment of the present invention, a plurality of engaging portions have the inverted L-shaped profile and extend upward and inward from the outer edges of the top surfaces of the second stepped portions.

In one embodiment of the present invention, at least one second fixer is disposed at the top surfaces of the second stepped portions to fix the liquid crystal panel.

In one embodiment of the present invention, the first stepped portions of the one-piece back plate are further disposed at the second edge and the fourth edge In one embodiment of the present invention, the second stepped portions are disposed at the second edge and the fourth edge, and an assembly opening is disposed at the fourth edge, and the liquid crystal panel is engaged by the top surfaces of the engaging portions and the second stepped portions.

In one embodiment of the present invention, the at least one first fixer is disposed at the top surfaces of the first stepped portions to fix the optical film assemble, and at least one second fixer is disposed at the top surfaces of the second stepped portions to fix the liquid crystal panel.

In one embodiment of the present invention, at least one flexible board supporting recess is formed at the top surface of the first stepped portion positioned to the fourth edge for supporting a flexible circuit board device disposed at one sides of the liquid crystal panel.

In one embodiment of the present invention, the one-piece back plate further comprises a circuit board cover configured to cover the flexible circuit board device.

To achieve another above object, the present invention provides a liquid crystal display module, comprising: a one-piece back plate, a lighting source device, an optical film assembly and a liquid crystal panel, wherein the one-piece back plate has a first edge, a second edge, a third edge and a fourth edge, and the first edge is opposite to the third edge, and the second edge is opposite to the fourth edge, and the one-piece back plate comprises: a plurality of first stepped portions having an inverted L-shaped profile and extending upward and outward at least from the first edge, the second edge and the third edge; a plurality of second stepped portions having the inverted L-shaped profile and extending upward and outward at least from outer edges of top surfaces of the first stepped portions at the first edge, the second edge and the third edge; and a plurality of engaging portions having the inverted L-shaped profile and extending upward and inward from outer edges of top surfaces of the second stepped portions; wherein the lighting source device is disposed in the one-piece back plate, and the optical film assembly is supported and mounted on the top surfaces of the first stepped portions, and the liquid crystal panel is supported and mounted on the top surfaces of the second stepped portions, and the liquid crystal panel is engaged by the top surfaces of the engaging portions and the second stepped portions.

To achieve one another above object, the present invention provides a one-piece back plate of a liquid crystal display module, comprising: a first edge, a second edge, a third edge and a fourth edge, wherein the first edge is opposite to the third edge, and the second edge is opposite to the fourth edge, and the one-piece back plate comprises: four first stepped portions having an inverted L-shaped profile and extending upward and outward from the first edge, the second edge, the third edge and the fourth edge; four second stepped portions having the inverted L-shaped profile and extending upward and outward from outer edges of top surfaces of the first stepped portions at the first edge, the second edge, the third edge and the fourth edge; and three engaging portions having the inverted L-shaped profile and extending upward and inward from outer edges of top surfaces of the second stepped portions at the first edge, the second edge and the third edge; wherein an optical film assembly is supported and mounted on the top surfaces of the first stepped portions, and a liquid crystal panel is supported and mounted on the top surfaces of the second stepped portions.

With the design of the one-piece back plate of the LCD module of the present invention, the one-piece back plate can be utilized to achieve the function of the housing and the front frame, and it is possible to omit the housing and the front frame, and the liquid crystal panel can be directly arranged on the one-piece back plate of the LCD module, so as to simplify and speed up the assembly process. Moreover, the research cost, development cycle and production cost thereof can be reduced.

DETAILED DESCRIPTION OF THE PREFERRED EMBODIMENTS

Figure 1:
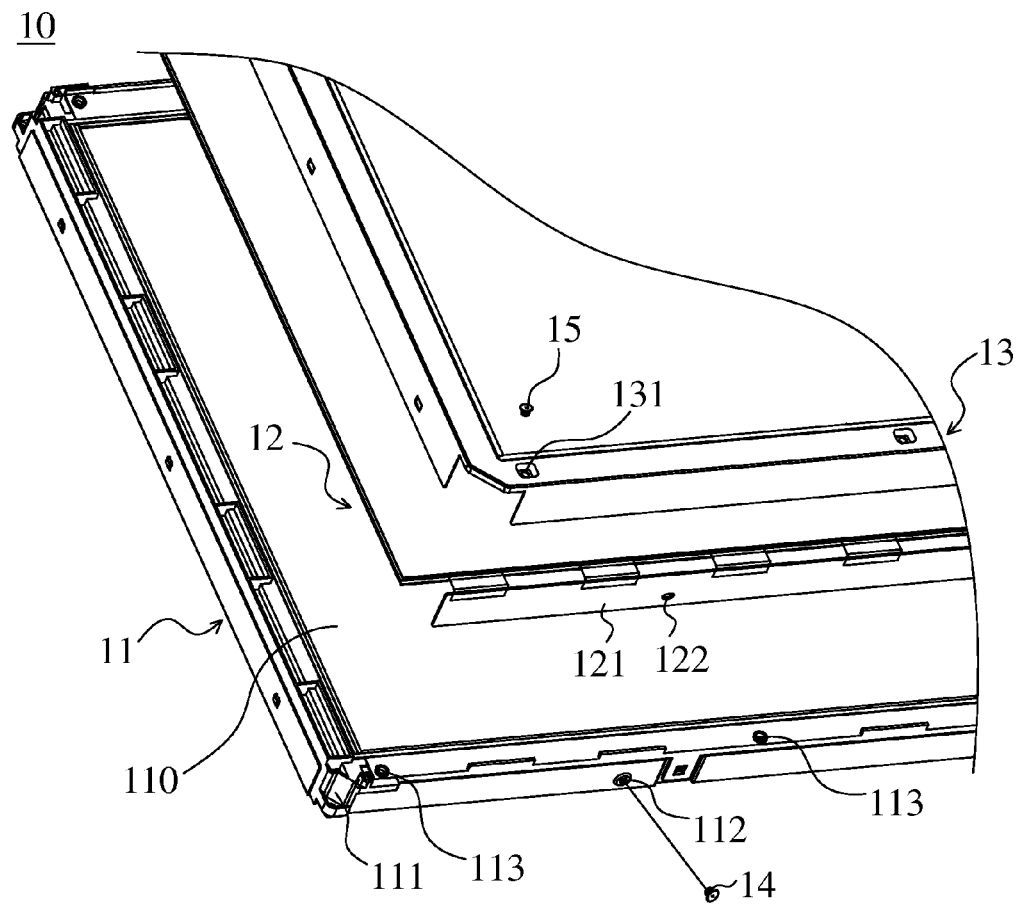
FIG. 1 is a partially exploded perspective view of a traditional liquid crystal module.
Figure 2:
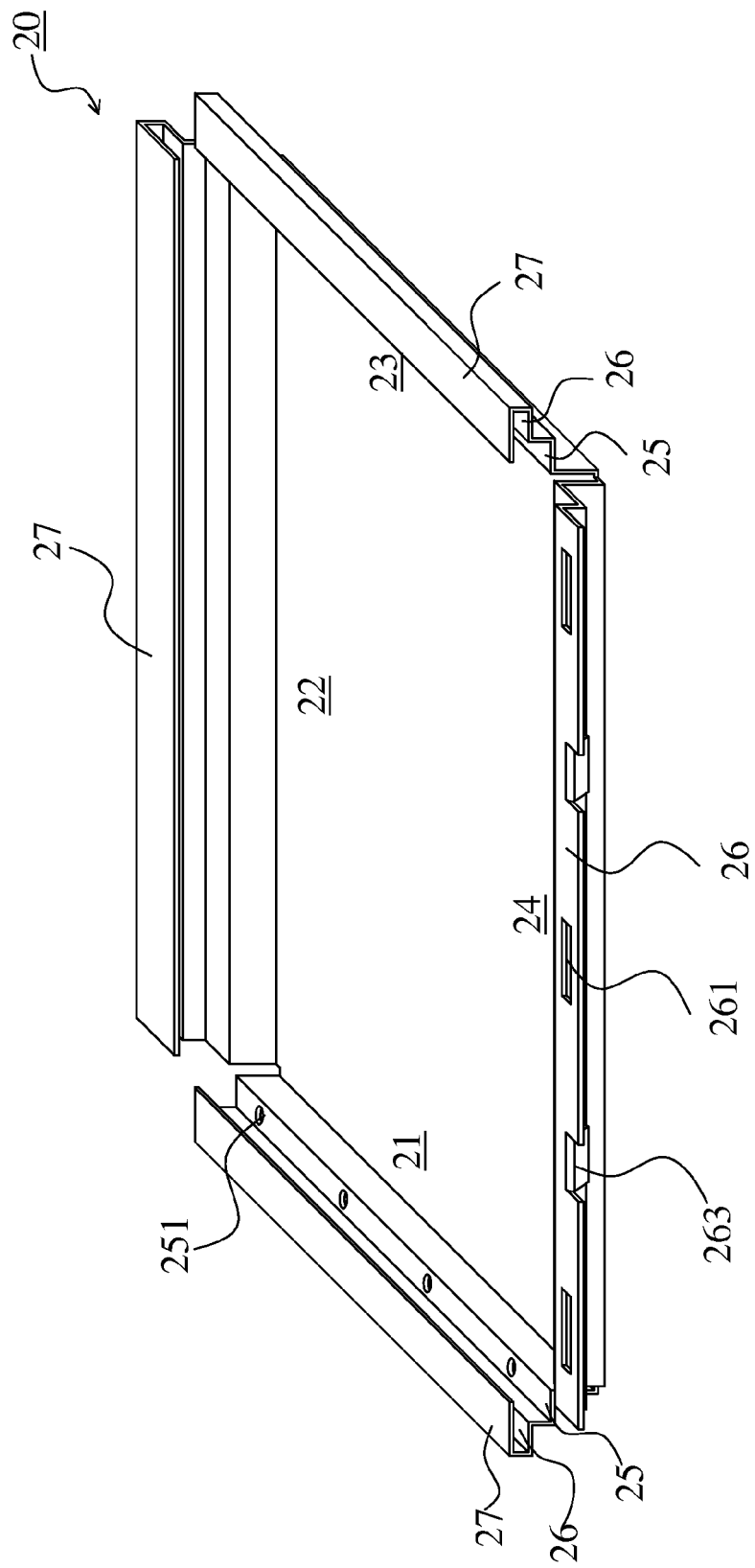
FIG. 2 is a perspective view of a liquid crystal display module according to a preferred embodiment of the present invention.

The structure and the technical means adopted by the present invention to achieve the above and other objects can be best understood by referring to the following detailed description of the preferred embodiments and the accompanying drawings, wherein:

Referring now to FIG. 2, FIG. 2 is a perspective view of a liquid crystal display module according to a preferred embodiment of the present invention. Referring to FIG. 2, a one-piece back plate 20 of the liquid crystal display module comprises a first edge 21, a second edge 22, a third edge 23 and a fourth edge 24, wherein the first edge 21 is opposite to the third edge 23, and the second edge 22 is opposite to the fourth edge 24. The one-piece back plate 20 of the liquid crystal display module comprises a plurality of first stepped portions 25, a plurality of second stepped portions 26 and a plurality of engaging portions 27. The characteristics of the structures are described below.

Firstly, referring to FIG. 2 again, the first stepped portions 25 have an inverted L-shaped profile, and each of the first stepped portions 25 extends upward and outward from the first edge 21, the second edge 22, the third edge 23 and the fourth edge 24.

Furthermore, referring to FIG. 2 again, the second stepped portions 26 have the inverted L-shaped profile, and each of the second stepped portions 26 extends upward and outward from an outer edge of a top surface of one of the first stepped portions (positioned at the first edge 21, the second edge 22, the third edge 23 and the fourth edge 24, respectively).

For more details, the engaging portions 27 have the inverted L-shaped profile and extend upward and inward from outer edges of top surfaces of the second stepped portions 26 at the first edge 21, the second edge 22 and the third edge 23.

Figure 3:
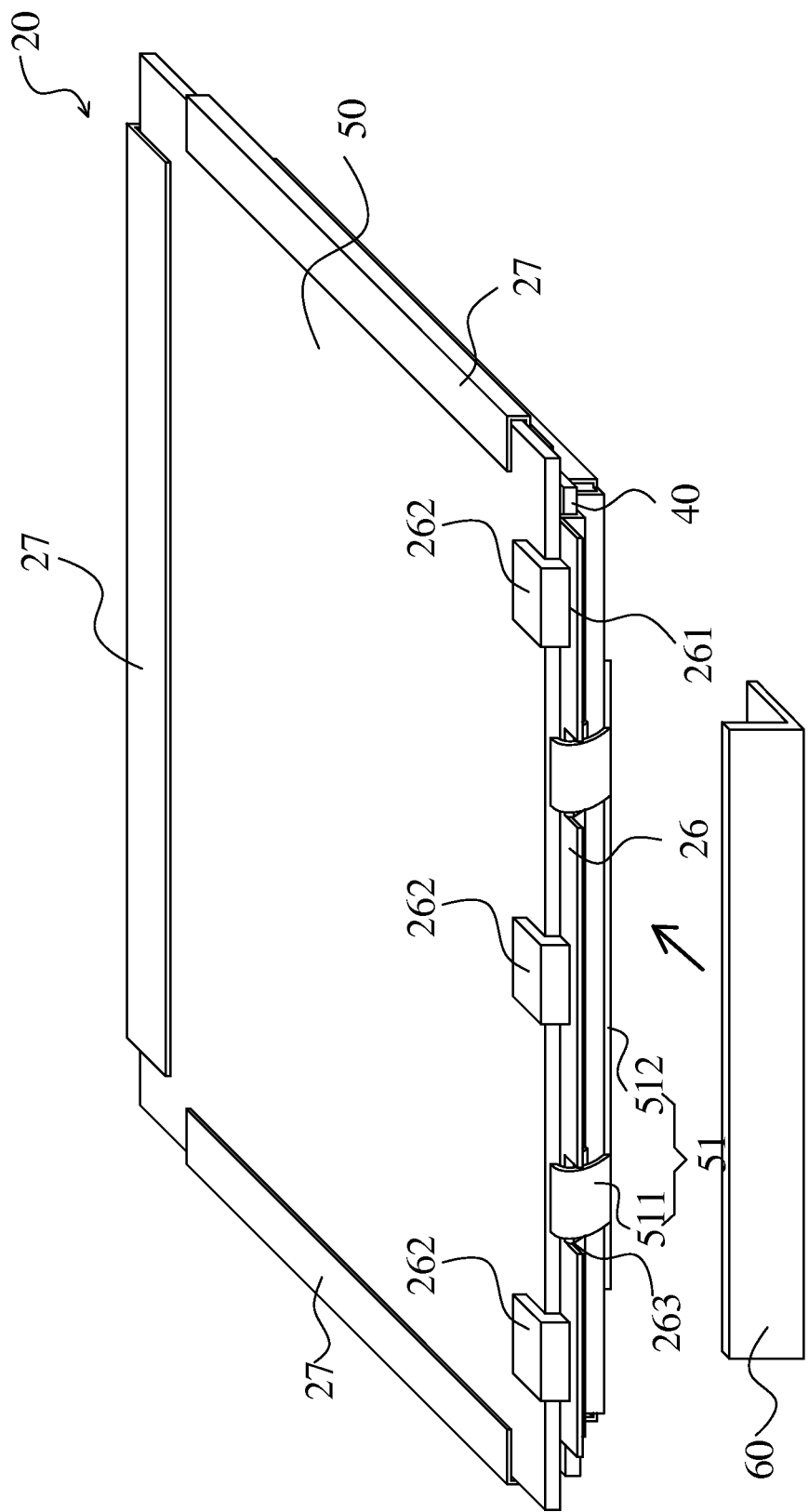
FIG. 3 is a perspective assembly diagram of a liquid crystal display module according to the preferred embodiment of the present invention.
Figure 4:
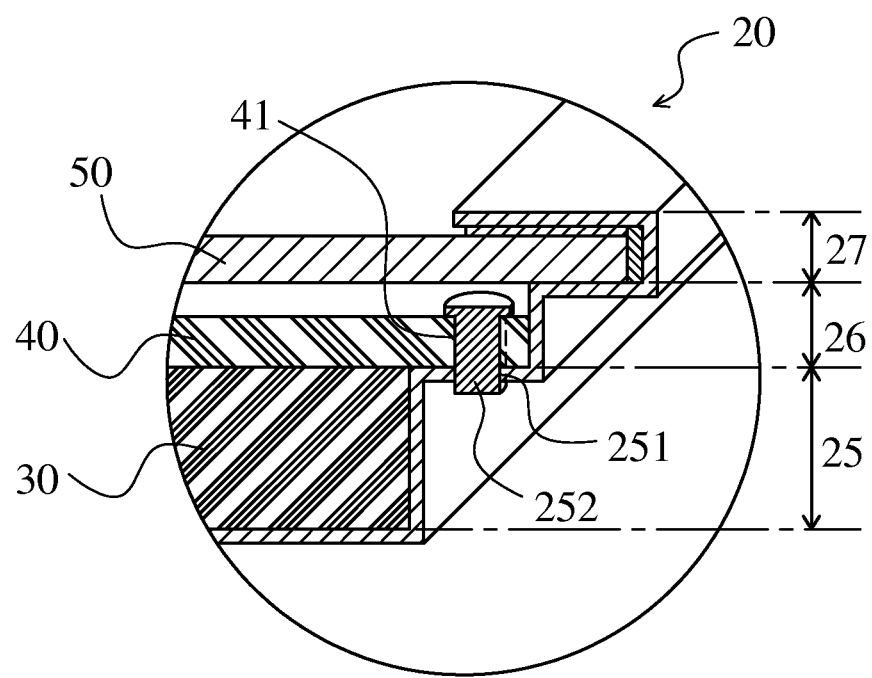
FIG. 4 is a partially cross-sectional view of the liquid crystal display module according to the preferred embodiment of the present invention.

Referring now to FIG. 2, FIG. 3 and FIG. 4, FIG. 3 is a perspective assembly diagram of a liquid crystal display module according to the preferred embodiment of the present invention, and FIG. 4 is a partially cross-sectional view of the liquid crystal display module according to the preferred embodiment of the present invention. Referring to FIG. 2, FIG. 3 and FIG. 4 again, the one-piece back plate 20 of the liquid crystal display module is configured to assemble a liquid crystal panel, and is described below.

The type of backlight sources applied to the back plate 20 of the liquid crystal display module is not limited in the present invention. A side-lighting source device 30 or a bottom-lighting source device 30 is disposed on an inner bottom of the one-piece back plate 20, i.e. disposed in a space enclosed by the bottom of the one-piece back plate 20 and the vertical walls of the first stepped portions 25. The lighting source device 30 may comprise varied lighting devices, a light guide plate and a reflective plate (not shown).

Besides, a supporting frame is formed by the top surfaces of the first stepped portions 25 positioned at the first edge 21, the second edge 22, the third edge 23 and the fourth edge 24 for supporting and mounting an optical film assembly 40. Furthermore, the optical film assembly 40 can be mounted by a twin adhesive or a screwing manner. For example, referring to FIG. 4, when the optical film assembly 40 is disposed downward into the supporting frame is formed by the top surfaces of the first stepped portions 25, by using a plurality of first fixers 252 (such as screws) to pass through corresponding holes 41 of the optical film assembly 40, the optical film assembly 40 is mounted to a plurality of first mounting holes (screw holes) 251 which are correspondingly formed on the top surfaces of the first stepped portions 25, and thus the optical film assembly 40 is firmly fixed.

Furthermore, the supporting frame formed by the top surfaces of the first stepped portions 25 positioned at the first edge 21, the second edge 22, the third edge 23 and the fourth edge 24 can be configured to support a liquid crystal panel 50. Furthermore, the liquid crystal panel 50 can be mounted by engaging or adding fixers. For example, referring to FIG. 3, the engaging portions 27 are disposed at the outer edges of top surfaces of the second stepped portions 26 which are positioned at the first edge 21, the second edge 22 and the third edge 23. The second stepped portions 26 and a corresponding assembly opening (not labeled) are formed at the fourth edge 24. Therefore, the liquid crystal panel 50 can be inserted in the assembly opening, and is engaged by the engaging portions 27 and the top surfaces of the second stepped portions 26. Furthermore, by using a plurality of second fixers 262 (such as L-shaped inserting elements made of a plastic or rubber material) to hold the edges of the liquid crystal panel 50, thereby mounting the liquid crystal panel 50 to a plurality of corresponding second mounting holes 261 which are correspondingly formed on the top surfaces of the second stepped portions 26, and thus the liquid crystal panel 50 is firmly fixed. However, the mounting manner of the liquid crystal panel 50 in the present invention is not limited to the above description. The user can use other methods to mount the liquid crystal panel 50 for arranging it on the second stepped portions 26.

With the use of the present invention, the first stepped portions 25 and the second stepped portions 26 can be disposed at the first edge 21, the second edge 22, the third edge 23 and the fourth edge 24 of the one-piece back plate 20, wherein the size of the supporting frame of the first stepped portions 25 is larger than the size of the bottom surface of the back plate 20, and the size of the supporting frame of the second stepped portions 26 is larger than the size of the supporting frame of the first stepped portions 25. Therefore, before the liquid crystal panel 50 is inserted in the one-piece back plate 20, the lighting source device 30 can be disposed downward to the inner bottom of the one-piece back plate 20, and then the optical film assembly 40 can also be optical film assembly 40 to the first stepped portions 25. Referring to FIG. 4, the one-piece back plate 20 is preferably a sheet metal part, and the first stepped portions 25, the second stepped portions 26 and the engaging portions 27 are preferably formed by extending and bending the bottom of the one-piece back plate 20 in sequence. In addition, the one-piece back plate 20 can selectively include a buffer pad disposed between the inner sidewall and the liquid crystal panel 50 for protecting the liquid crystal panel 50 engaged in the engaging portions 27.

However, the arrangement of the first stepped portions 25, the second stepped portions 26 and the engaging portions 27 positioned at the first edge 21, the second edge 22, the third edge 23 and the fourth edge 24 of the one-piece back plate 20 of the present invention, is not limited to the above description. The present invention may comprise varied assemblies. For example, the first stepped portions 25 are at least disposed at the first edge 21 and the third edge 23, and the second stepped portions 26 are also at least disposed at the first edge 21 and the third edge 23, so as to support the optical film assembly 40 and the liquid crystal panel 50. In addition, when the one-piece back plate 20 does not have the engaging portions 27, the liquid crystal panel 50 can be fixed only by the second fixers 262. Therefore, a user can adjust the number and disposed position of the first stepped portions 25, the second stepped portions 26 and the engaging portions 27 according to the actual needs thereof.

Referring to FIG. 2 and FIG. 3 again, the liquid crystal panel 50 includes at least one flexible circuit board device 51 (such as chip on film, COF, i.e. a package structure of a driving circuit board with a chip mounted on a film) positioned to the fourth edge 24 of the one-piece back plate 20. A flexible board supporting recess 263 is correspondingly formed at the top surface of the second stepped portion 26 positioned to the fourth edge 24. The flexible board supporting recess 263 can have a larger round corner formed by bending the sheet metal part for supporting the flexible board portion 511 of the flexible circuit board at the edge of the liquid crystal panel, and preventing the flexible board portion 511 from being split in assembly. The flexible circuit board 512 at the other end of the flexible circuit board device 51 can be mounted on the rear surface of the one-piece back plate 20. Furthermore, the liquid crystal display module further comprises a circuit board cover 60 having an L-shaped profile configured to cover and protect the flexible circuit board device 51.

As described above, in comparison with the traditional LCD module which needs a back plate, a housing and a front frame, and have a complicated assembly method, resulting the raised development cost and assembly time, the first stepped portions 25, the second stepped portions 26 and the engaging portions 27 can be disposed at the edges of the one-piece back plate 20 of the present invention, and the optical film assembly 40 can be supported and mounted by the first stepped portions 25, and the liquid crystal panel 50 can be supported and mounted by the second stepped portions 26, and the liquid crystal panel 50 can be engaged and held by the engaging portions 27 and the second stepped portions 26. Therefore, the one-piece back plate 20 can be utilized to achieve the function of the housing and the front frame, and it is possible to omit the housing and the front frame, and the liquid crystal panel 50 can be directly arranged on the one-piece back plate 20, so as to simplify and speed up the assembly process. Moreover, the research cost, development cycle and production cost thereof can be reduced.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A one-piece back plate of a liquid crystal display module, comprising:
   a first edge, a second edge, a third edge and a fourth edge, wherein the first edge is opposite to the third edge, and the second edge is opposite to the fourth edge;
   wherein the one-piece back plate comprises:
   four first stepped portions having an inverted L-shaped profile and extending upward and outward from the first edge, the second edge, the third edge and the fourth edge;
   four second stepped portions having the inverted L-shaped profile and extending upward and outward from outer edges of top surfaces of the first stepped portions at the first edge, the second edge, the third edge and the fourth edge; and
   three engaging portions having the inverted L-shaped profile and extending upward and inward from outer edges of top surfaces of the second stepped portions at the first edge, the second edge and the third edge;
   wherein an optical film assembly is supported and mounted on the top surfaces of the first stepped portions, and a liquid crystal panel is supported and mounted on the top surfaces of the second stepped portions.

2. The one-piece back plate of the liquid crystal display module according to claim 1, wherein an assembly opening is disposed at the second stepped portions of the fourth edge, and at least one first fixer is disposed at the top surfaces of the first stepped portions to fix the optical film assembly, and at least one second fixer is disposed at the top surfaces of the second stepped portions to fix the liquid crystal panel.

3. A one-piece back plate of a liquid crystal display module, comprising:
   a first edge, a second edge, a third edge and a fourth edge, wherein the first edge is opposite to the third edge, and the second edge is opposite to the fourth edge;
   wherein the one-piece back plate comprises:
   a plurality of first stepped portions having an inverted L-shaped profile and extending upward and outward at least from the first edge and the third edge; and
   a plurality of second stepped portions having the inverted L-shaped profile and extending upward and outward at least from outer edges of top surfaces of the first stepped portions at the first edge and the third edge;
   wherein an optical film assembly is supported and mounted on the top surfaces of the first stepped portions, and a liquid crystal panel is supported and mounted on the top surfaces of the second stepped portions.

4. The one-piece back plate of the liquid crystal display module according to claim 3, wherein at least one first fixer is disposed at the top surfaces of the first stepped portions to fix the optical film assembly.

5. The one-piece back plate of the liquid crystal display module according to claim 3, wherein a plurality of engaging portions have the inverted L-shaped profile and extend upward and inward from the outer edges of the top surfaces of the second stepped portions.

6. The one-piece back plate of the liquid crystal display module according to claim 3, wherein at least one second fixer is disposed at the top surfaces of the second stepped portions to fix the liquid crystal panel.

7. The one-piece back plate of the liquid crystal display module according to claim 3, wherein the first stepped portions of the one-piece back plate are further disposed at the second edge and the fourth edge.

8. The one-piece back plate of the liquid crystal display module according to claim 7, wherein the second stepped portions are disposed at the second edge and the fourth edge, and an assembly opening is disposed at the fourth edge, and the liquid crystal panel is engaged by the top surfaces of the engaging portions and the second stepped portions.

9. The one-piece back plate of the liquid crystal display module according to claim 8, wherein the at least one first fixer is disposed at the top surfaces of the first stepped portions to fix the optical film assemble, and at least one second fixer is disposed at the top surfaces of the second stepped portions to fix the liquid crystal panel.

10. The one-piece back plate of the liquid crystal display module according to claim 8, wherein at least one flexible board supporting recess is formed at the top surface of the first stepped portion positioned to the fourth edge for supporting a flexible circuit board device disposed at one sides of the liquid crystal panel.

11. The one-piece back plate of the liquid crystal display module according to claim 10, wherein the one-piece back plate further comprises a circuit board cover configured to cover the flexible circuit board device.

12. A liquid crystal display module, comprising: a one-piece back plate, a lighting source device, an optical film assembly and a liquid crystal panel, wherein the one-piece back plate has a first edge, a second edge, a third edge and a fourth edge, and the first edge is opposite to the third edge, and the second edge is opposite to the fourth edge; wherein the one-piece back plate comprises:
   a plurality of first stepped portions having an inverted L-shaped profile and extending upward and outward at least from the first edge, the second edge and the third edge;
   a plurality of second stepped portions having the inverted L-shaped profile and extending upward and outward at least from outer edges of top surfaces of the first stepped portions at the first edge, the second edge and the third edge; and
   a plurality of engaging portions having the inverted L-shaped profile and extending upward and inward from outer edges of top surfaces of the second stepped portions;
   wherein the lighting source device is disposed in the one-piece back plate, and the optical film assembly is supported and mounted on the top surfaces of the first stepped portions, and the liquid crystal panel is supported and mounted on the top surfaces of the second stepped portions, and the liquid crystal panel is engaged by the top surfaces of the engaging portions and the second stepped portions.

13. The liquid crystal display module according to claim 12, wherein at least one first fixer is disposed at the top surfaces of the first stepped portions to fix the optical film assembly.

14. The liquid crystal display module according to claim 12, wherein a plurality of engaging portions have the inverted L-shaped profile and extend upward and inward from the outer edges of the top surfaces of the second stepped portions.

15. The liquid crystal display module according to claim 12, wherein at least one second fixer is disposed at the top surfaces of the second stepped portions to fix the liquid crystal panel.

16. The liquid crystal display module according to claim 12, wherein the first stepped portions of the one-piece back plate are further disposed at the second edge and the fourth edge.

17. The liquid crystal display module according to claim 16, wherein the second stepped portions are disposed at the second edge and the fourth edge, and an assembly opening is disposed at the fourth edge, and the liquid crystal panel is engaged by the top surfaces of the engaging portions and the second stepped portions.

18. The liquid crystal display module according to claim 17, wherein the at least one first fixer is disposed at the top surfaces of the first stepped portions to fix the optical film assemble, and at least one second fixer is disposed at the top surfaces of the second stepped portions to fix the liquid crystal panel.

19. The liquid crystal display module according to claim 17, wherein at least one flexible board supporting recess is formed at the top surface of the first stepped portion positioned to the fourth edge for supporting a flexible circuit board device disposed at one sides of the liquid crystal panel.

20. The liquid crystal display module according to claim 19, wherein the one-piece back plate further comprises a circuit board cover configured to cover the flexible circuit board device.

* * * * *